Patented Aug. 1, 1933

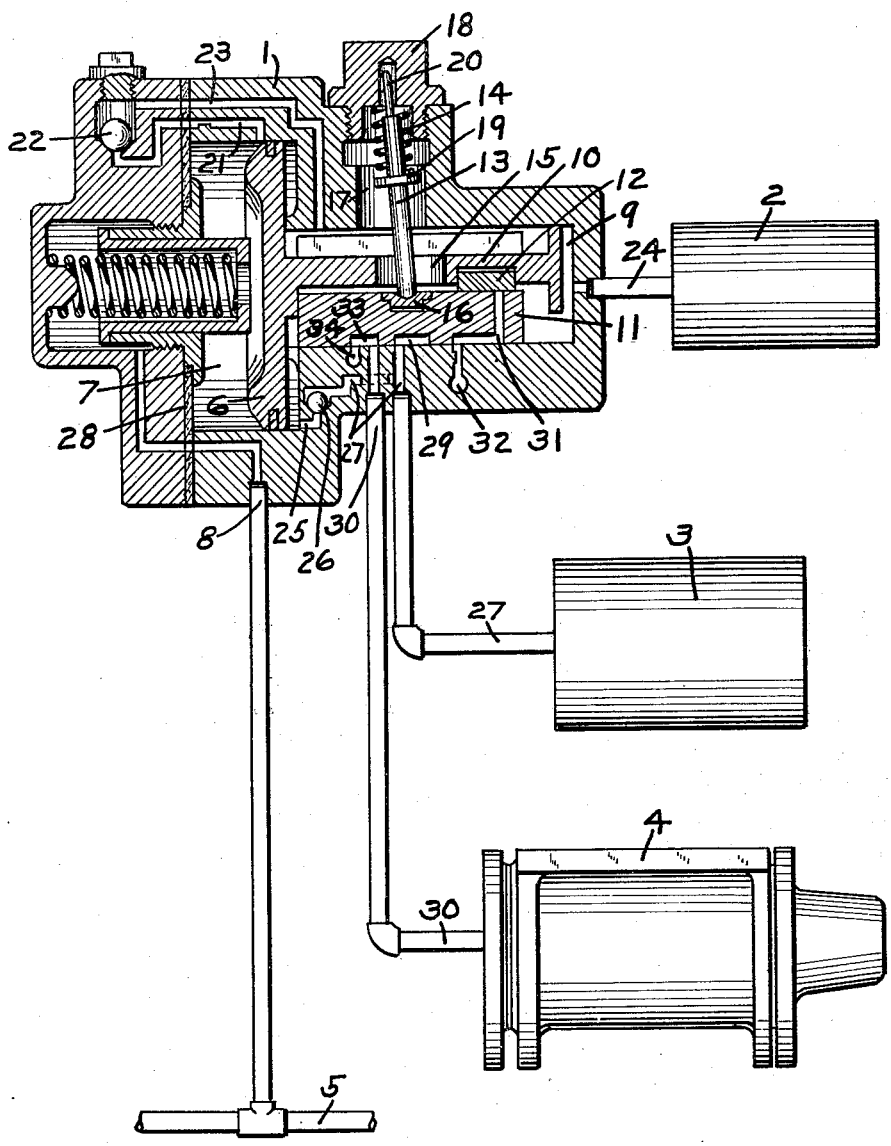

1,920,940

UNITED STATES PATENT OFFICE 1,920,940

MEANS FOR HOLDING SLIDE VALVE TO SEAT

Clyde C. Farmer, Pittsburgh, Pa., assignor to The Westinghouse Air Brake Company, Wilmerding, Pa., a Corporation of Pennsylvania Application May 8, 1931. Serial No. 535,954
Renewed August 12, 1932

6 Claims. (Cl. 303—1)

This invention relates to fluid pressure valve devices, and more particularly to a valve device having a slide valve movable on a seat.

It has heretofore been proposed to provide means for holding a slide valve to its seat against fluid pressure tending to lift the valve from its seat.

The principal object of my invention is to provide improved means for holding a slide valve to its seat, in which a minimum resistance is offered to movement of the slide valve on its seat.

In the accompanying drawing, the single figure is a diagrammatic view of a car fluid pressure brake equipment including a valve device embodying my invention.

In order to illustrate an application of my invention, I have shown the same applied to a valve device of a fluid pressure brake equipment comprising a brake controlling valve device 1, a volume reservoir 2, a pressure reservoir 3, a brake cylinder 4, and a brake pipe 5.

The brake controlling valve device 1 comprises a casing containing a piston 6 having at one side a chamber 7 open to the brake pipe 5 through a passage and pipe 8 and having at the opposite side a chamber 9 communicating with the volume reservoir 2. The piston 6 has a stem 10 extending into chamber 9, which also contains a main slide valve 11 and an auxiliary slide valve 12 adapted to be operated by said piston through the medium of the piston stem 10.

According to my invention, I provide a pin 13 for transmitting the pressure of a spring 14 to the slide valve 11. One end of the pin 13 freely extends through an aperture 15 in the piston stem 10 and engages in a recess of an insert 16 carried by the slide valve, the other end of the pin extending into a bore 17 in the casing. The bore 17 opens into chamber 9, and the outer open end of the bore 17 is closed by a nut 18 having screw-threaded engagement in the casing.

The nut 18 is provided with a bore, into which the upper end portion 20 of the pin 13 loosely extends. The spring 14 surrounds the pin 13 and is interposed between the nut 18 and a collar 19 on said pin. The end portion 20 of the pin 13 is of reduced diameter, so that the bore into which said end portion extends may be sufficiently small, and yet provide the desired freedom for the end portion of said stem, that an adequate seat for the spring 14 may be obtained.

In operation, fluid under pressure is supplied to the brake pipe 5 in the usual manner and flows from the brake pipe to the piston chamber 7. With the piston 6 in the inner position, as shown in the drawing, fluid under pressure flows from chamber 7 through passage 21, past ball check valve 22 and through passage 23 to valve chamber 9 and from thence through passage and pipe 24 to the volume reservoir 2. Fluid under pressure also flows from chamber 9 through passage 25, past the check valve 26 and through passage and pipe 27 to the reservoir 3.

To effect an application of the brakes, fluid under pressure is vented from the brake pipe 5 and piston chamber 7. Due to check valve 22, back flow from valve chamber 9 to piston chamber 7 is prevented, so that the pressure of fluid in valve chamber 9 shifts the piston 6 and slide valves 11 and 12 against the reduced pressure in piston chamber 7, to application position, in which said piston engages a gasket 28.

In application position of the main slide valve 11, a cavity 29 connects passage 27 from the reservoir 3 to a passage 30 leading to the brake cylinder 4, so that fluid under pressure is permitted to flow from the reservoir 3 to the brake cylinder 4 and apply the brakes. The valve chamber 9 is opened to the atmosphere through port 31 in the main slide valve, which port is uncovered by the auxiliary slide valve 12, and a restricted atmospheric passage 32, so that fluid under pressure is permitted to flow from the valve chamber 9 and the connected volume reservoir 2.

If the pressure in the brake pipe and piston chamber 7 is reduced to that of the atmosphere, the pressure in valve chamber 9 will also reduce to substantially the same degree, in which case the pressure of spring 14 acting through the pin 13 on the slide valve 11 is the only means for holding the slide valve 11 seated against the opposing brake cylinder pressure acting in cavity 29 and tending to lift said slide valve from its seat.

To effect a release of the brakes, fluid under pressure is supplied to the brake pipe and to piston chamber 7, which pressure shifts the piston 6 and slide valves 11 and 12 to their release position, in which the reservoirs 2 and 3 are supplied with fluid under pressure from the brake pipe in, the same manner as in initially charging the brake equipment, and the brake cylinder 4 is open to the atmosphere through pipe and passage 30, cavity 33 in the slide valve 11 and an atmospheric passage 34. Fluid under pressure is thus vented from the brake cylinder to effect a release of the brakes.

It will be noted that as the slide valve moves from release to application position and from application to release position, that the lower end of the pin 13 is carried by said slide valve in the recess in the insert 16 and the pin loosely pivots about the end portion 20, which is primarily adapted to maintain operative relation between the pin 13 and spring 14. The insert 16 is placed in the slide valve 11 for providing a batter wearing surface for the rounded end of the pin 13 than would be obtained by direct engagement of the pin with the slide valve and if for any reason excessive wear does occur between these two parts, replacement of the insert 16 can be made without replacement of the slide valve.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination in a casing containing a slide valve subject on its seating face to fluid under pressure, of a pin having one end engaging and movable with said slide valve, and a spring acting on said pin for holding said slide valve seated, the pressure exerted by the spring being the sole pressure which is transmitted through the pin to the valve.

2. The combination in a casing containing a slide valve subject on its seating face to fluid under pressure, of a pin having one end in rocking engagement with said slide valve and the other end extending into said casing, and a spring interposed between said casing and said pin for exerting a seating pressure on said slide valve, the pin being pressed against the valve solely by the pressure of said spring.

3. The combination in a casing containing a slide valve subject on its seating face to fluid under pressure, of a pin having one end in rocking engagement with said slide valve and the other end loosely extending into a bore in the casing, a collar on said stem, and a spring interposed between said collar and casing for exerting a seating pressure through said pin on said slide valve, said spring being the sole means for exerting pressure on the pin.

4. In a fluid pressure brake apparatus, the combination with a casing having a chamber and a bore constantly open to the chamber, and a slide valve contained in said chamber, of a pin contained in said bore having rocking engagement at one end with said slide valve, and a spring contained in said bore interposed between and engaging said casing and pin for exerting a seating pressure on said valve.

5. In a fluid pressure brake apparatus, the combination with a casing having a chamber and a bore constantly open to the chamber, and a slide valve contained in said chamber, of a pin contained in said bore having rocking engagement at one end with said slide valve and at the other end being in rockable relation with the casing, and a spring interposed between and engaging said casing and pin for exerting a seating pressure on said valve.

6. In a fluid pressure brake apparatus, the combination with a casing having a chamber and a bore constantly open to the chamber, and a slide valve contained in said chamber, of a pin contained in said bore having rocking engagement at one end with said slide valve and at the other end being adapted to rockably engage said casing within said bore, and means interposed between and engaging said casing and pin for exerting a seating pressure on said valve.

CLYDE C. FARMER.